United States Patent
Fleetham

(10) Patent No.: US 6,187,361 B1
(45) Date of Patent: Feb. 13, 2001

(54) METHOD FOR MAKING A SHAPED HOT DOG

(76) Inventor: Gregory F. Fleetham, 4303 Carina Street, Hamner, Ontario (CA), P3P 1L4

( * ) Notice: Under 35 U.S.C. 154(b), the term of this patent shall be extended for 0 days.

(21) Appl. No.: 09/206,226

(22) Filed: Dec. 7, 1998

(51) Int. Cl.$^7$ ................................................. A23L 1/317
(52) U.S. Cl. ........................... 426/513; 426/76; 426/104; 426/518; 426/641
(58) Field of Search .................. 426/76, 104, 105, 426/518, 641, 523

(56) References Cited

U.S. PATENT DOCUMENTS

| | | |
|---|---|---|
| 3,940,842 | 3/1976 | Perrinelle et al. . |
| 3,999,293 | 12/1976 | Zubrycki . |
| 4,967,477 | 11/1990 | Sanford . |
| 4,976,029 | 12/1990 | Kennedy . |
| 5,067,241 | 11/1991 | Goodman . |
| 5,069,914 | * 12/1991 | Gafliardi ........................... 426/104 X |
| 5,415,881 | * 5/1995 | Gafliardi ........................... 426/104 X |
| 5,771,771 | 6/1998 | Gagliardi, Jr. . |
| 5,976,585 | * 11/1999 | Gafliardi ........................... 426/105 X |

OTHER PUBLICATIONS

Rosen, *How to Garash*, p. 32, Au 1761, 1983.*

* cited by examiner

*Primary Examiner*—Arthur L. Corbin
(74) *Attorney, Agent, or Firm*—Bereskin & Parr

(57) ABSTRACT

A shaped hot dog, and a method of forming a shaped hot dog from an elongated generally cylindrical wiener. The wiener is provided with cuts extending longitudinally from each end a distance selected to maintain a cylindrical middle portion intact. The cuts form distal portions which extend away from each side of the middle portion. The distal portions curl outwardly on cooking, and the resulting shaped hot dog has an appealing shape which, in a preferred embodiment, resembles a spider.

8 Claims, 2 Drawing Sheets

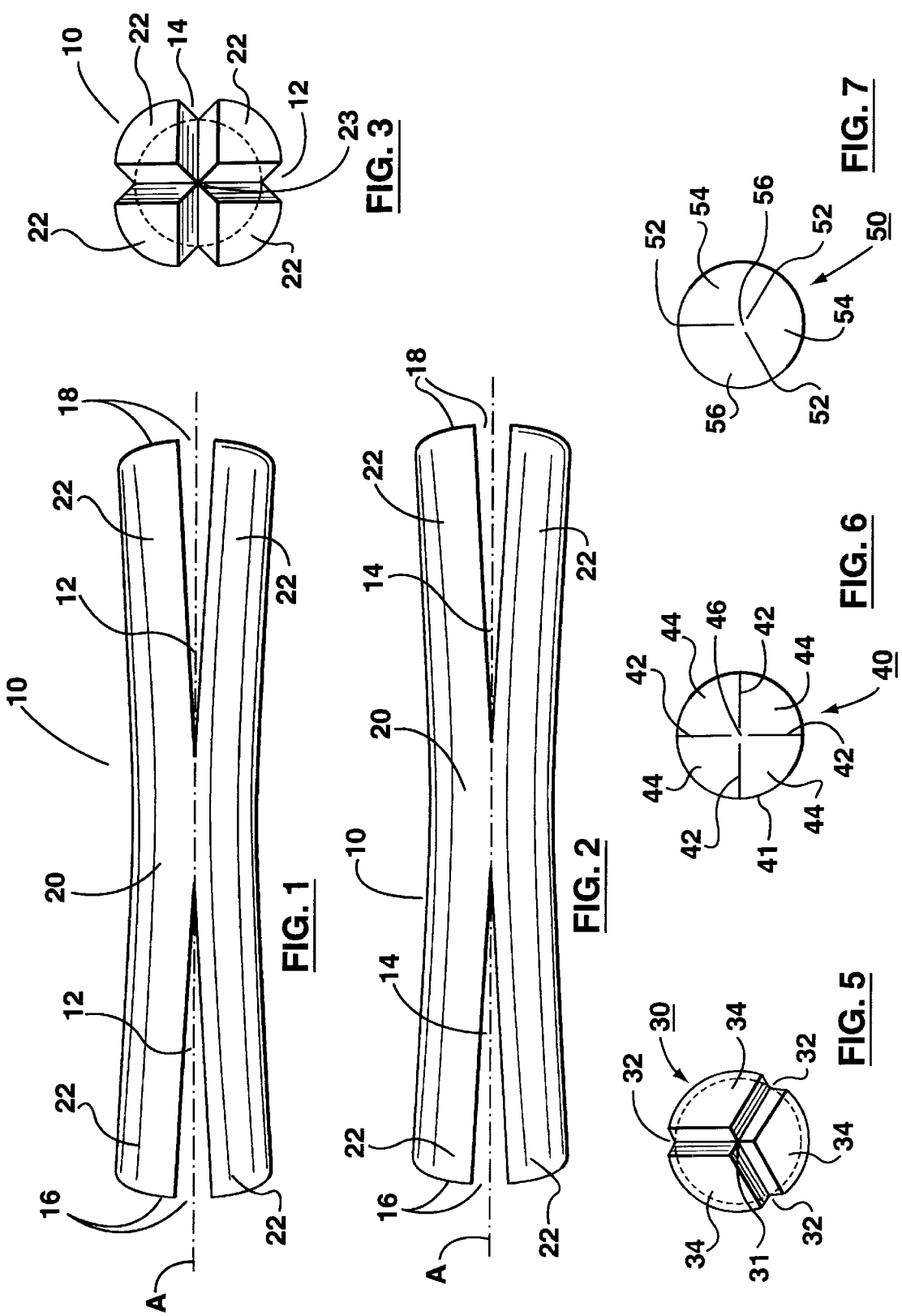

METHOD FOR MAKING A SHAPED HOT DOG

FIELD OF THE INVENTION

This invention relates to food products, and in particular, to hot dogs and methods for preparing same.

BACKGROUND OF THE INVENTION

The simple hot dog is a perennial favourite among children and adults. Hot dogs, also known as frankfurters, are generally sold in airtight packages of eight or twelve, and are typically cooked by roasting them on a barbecue or over a campfire, or boiling them in a pot of water. Hot dogs are often served in specially designed elongated buns, although many people choose to eat hot dogs without buns.

The hot dog when served without a bun tends to have an uninteresting shape, especially to children. While modifications to the hot dog can be made after cooking to improve its appearance, such as cutting the hot dog into small pieces, these modifications tend to be a nuisance. The hot dog may prove to be too flexible or slippery to cut properly, and the heat emanating from the hot dog may sometimes cause discomfort during the cutting process.

When hot dogs are cooked, sections are sometimes undercooked or overcooked. As a result, the hot dog may have portions with an undesirable taste or texture or which pose a health risk.

There is accordingly a need for an improved hot dog which overcomes the disadvantages of the prior art.

SUMMARY OF THE INVENTION

The present invention is directed towards a shaped hot dog comprising a generally cylindrical wiener having a longitudinal axis. The wiener is provided with cuts which extend longitudinally from each end of the wiener a selected distance along the longitudinal axis which maintains a cylindrical middle portion of the wiener intact. The cuts form distal portions extending away from each side of the middle portion which curl outwardly relative to the longitudinal axis on cooking. The cuts preferably comprise a pair of orthogonal, diametrically extending, intersecting cuts.

Another aspect of this invention is a method of forming a shaped hot dog from an elongated, generally cylindrical wiener. Cuts are made that extend longitudinally from each end of the wiener a distance selected to maintain a cylindrical middle portion of the wiener intact. The cuts form distal portions which extend from each side of the intact middle portion. The wiener is then heated using an appropriate cooking means until the distal portions curl outwardly with respect to the longitudinal axis.

The subject method preferably involves making a pair of intersecting, orthogonal, diametrically extending cuts. Alternatively, the cuts may extend radially inwardly from the periphery of the wiener. Where radial cuts are used, the cuts are made to a specified depth such that a thin longitudinal axial portion of the wiener remains intact. The distal portions separate upon cooking, allowing them to curl outwardly relative to the longitudinal axis.

BRIEF DESCRIPTION OF THE DRAWINGS

The present invention will now be described, by way of example only, by reference to the accompanying drawings, in which:

FIG. 1 is a top view of a shaped hot dog made in accordance with a preferred embodiment of the subject invention, shown prior to cooking;

FIG. 2 is a side view of the preferred embodiment of the subject invention;

FIG. 3 is an end view of the preferred embodiment of the subject invention;

FIG. 5 is an end view of an alternative embodiment of the subject invention;

FIG. 6 is an end view of another alternative embodiment of the present invention;

FIG. 7 is an end view of a further alternative embodiment.

DETAILED DESCRIPTION OF THE PREFERRED EMBODIMENTS

Figure 4:
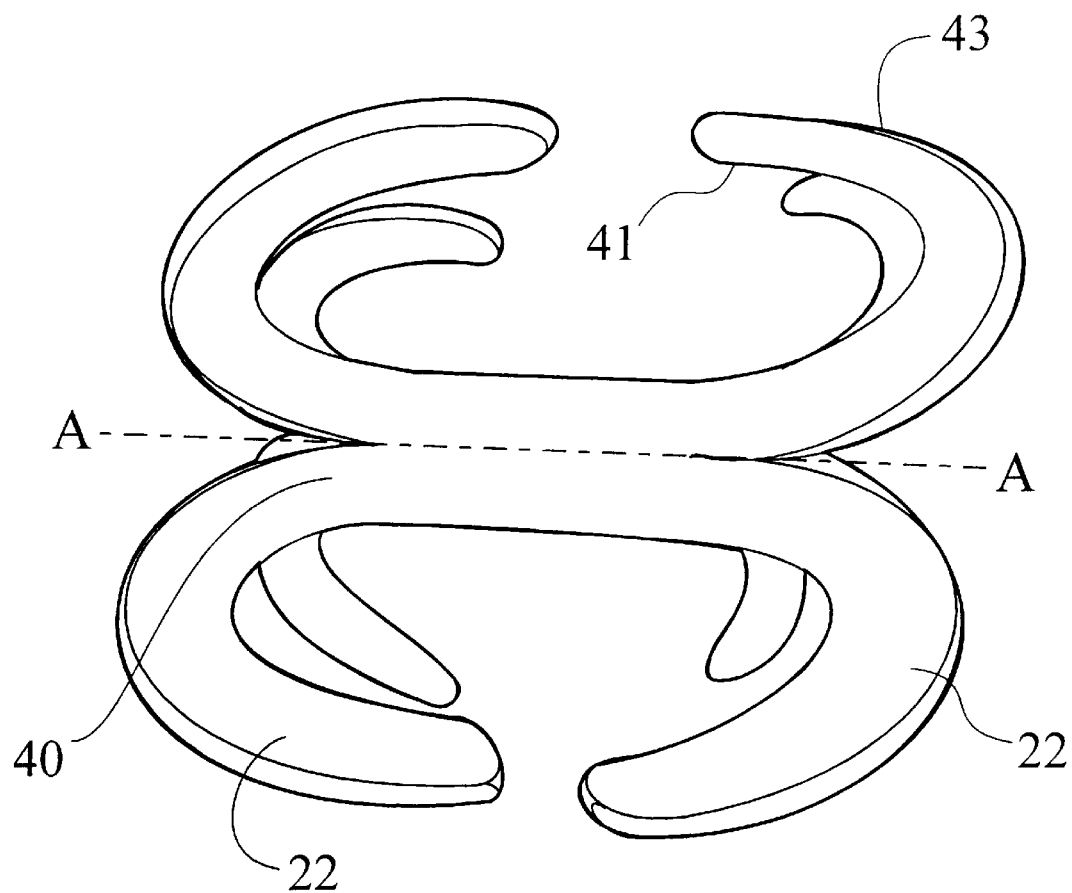
FIG. 4 is a perspective view of the preferred embodiment, shown after cooking.

Referring now to FIGS. 1 to 3, illustrated therein is a hot dog 10 made in accordance with a preferred embodiment of the subject invention, shown prior to cooking. Hot dog 10 comprises a wiener, frankfurter or the like, composed of meat and/or vegetable materials, having a generally elongated, cylindrical shape. Prior to packaging or immediately prior to cooking, hot dog 10 is cut as shown in FIGS. 1 to 3 using a knife or other appropriate cutting means.

Longitudinal cuts 12, 14 extend from wiener ends 16, 18 a selected distance along longitudinal axis A such that cylindrical middle portion 20 remains intact. In the case of a conventional 6" long wiener, cuts 12 and cuts 14 extend approximately 2" along longitudinal axis A to a position approximately ½" from the mid-point of the wiener, resulting in an intact middle portion 20 approximately 1" in length.

Longitudinal cuts 12, 14 are preferably orthogonal to each other and preferably extend diametrically across wiener ends 16, 18, so as to intersect each other at center point 23 of wiener ends 16, 18. Cuts 12, 14 form four cut distal portions 22 extending away from each side of middle portion 20, for a total of eight distal portions 22 per wiener. Each distal portion 22 has a generally quadrant-shaped cross-section.

After cuts 12, 14 are made, hot dog 10 can be packaged and stored in the usual fashion. Alternatively, hot dog 10 can be immediately cooked by the end user. Hot dog 10 is preferably cooked by piercing cylindrical middle portion 20 with a long fork or some other appropriate instrument and holding hot dog 10 over an open fire or other heat source.

Referring now to FIG. 4, during cooking the smooth outside surface 41 of distal portions 22 does not expand, whereas the cut inside portions 43 of distal portions 22 expand upon exposure to heat. As a result, during the cooking process, distal portions 22 curl outwardly, away from longitudinal axis A, thereby assuming a convex shape relative to longitudinal axis A. The resulting cooked hot dog 40 has eight curved "legs", and looks something like a spider.

Referring now to FIG. 5, in an alternative embodiment of the invention, each end of hot dog 30 is provided with three longitudinally extending radial cuts 32 made at angles of approximately 120° from each other, which intersect at mid-point 31. The resulting cut distal portions 34 have sector-shaped cross-sections of similar size and shape. Upon cooking, hot dog 30 assumes a six-legged "spider" shape.

Referring to FIG. 6, in another alternative embodiment of the invention, each end of hot dog 40 is provided with four longitudinal cuts 42 which extend radially inwardly from the periphery 41 of hot dog 40 at 90° angles to each other, thereby forming four distal portions 44. The radial length or depth of cuts 42 is selected so that cuts 42 do not intersect, leaving uncut central portion 46 extending along the longitudinal axis of the wiener. As a result, distal portions 44 are not fully severed prior to cooking, which allows for ease of packaging. As long as uncut axial portion 46 is relatively thin, upon application of heat to hot dog 40, distal portions 44 separate from one another. The resulting severed distal portions 44 curl such that they are convex with respect to the longitudinal axis.

Referring to FIG. 7, in yet another alternative embodiment of the invention, each end of hot dog 50 is provided with three cuts 52 extending radially inwardly at angles of approximately 120° from each other, thereby forming three distal portions 54. The depth of cuts 52 are selected so that cuts 52 do not intersect, leaving uncut central portion 56 along the longitudinal axis of the wiener. As a result, distal portions 54 are not fully severed, which allows for ease of packaging. As long as uncut portion 56 is relatively thin, upon cooking hot dog 50, distal cut portions 54 separate from one another, and curl outwardly relative to the longitudinal axis.

The subject invention accordingly provides a hot dog that will assume an interesting shape upon cooking which appeals greatly to children. The method of the subject invention also results in a hot dog which is cooked evenly and thoroughly.

It should be understood that various changes may be made to the embodiments of the invention described herein without departing from the subject invention, the scope of which is defined in the following claims.

I claim:

1. A method of forming a shaped hot dog from a generally cylindrical wiener having a longitudinal axis, comprising the steps of:

a) making cuts extending longitudinally from each end of the wiener a selected distance along the longitudinal axis, the distance being selected to maintain a cylindrical middle portion of the wiener intact, thereby forming a maximum of four distal portions extending away from each side of the middle portion;

b) piercing the middle portion of the wiener with a holding instrument; and c) holding the wiener over a heat source until the distal portions curl outwardly relative to the longitudinal axis and back towards the middle portion such that the wiener assumes a spider-like shape.

2. The method according to claim 1, wherein a pair of diametrical and intersecting cuts are made from each end of the wiener.

3. The method according to claim 1, wherein the cuts are orthogonal.

4. The method according to claim 1, wherein the cuts comprise four orthogonal cuts, and the distal portions have quadrant-shaped cross-sections.

5. The method according to claim 1, wherein the cuts extend radially inwardly from the periphery of the wiener.

6. The method according to claim 5, wherein the cuts have a predetermined depth selected to maintain a longitudinal axial portion of the wiener intact, wherein the axial portion is sufficiently thin to allow the distal portions to separate when heated.

7. The method according to claim 5, wherein the cuts comprise four cuts extending inwardly at 90° angles to each other.

8. The method according to claim 5, wherein the cuts comprise three equally spaced cuts extending inwardly at 120° angles to each other.

* * * * *